(12) United States Patent
Steinwandel et al.

(10) Patent No.: US 9,150,941 B2
(45) Date of Patent: Oct. 6, 2015

(54) METHOD FOR PREVENTING CRACK FORMATION AND FOR SLOWING DOWN THE ADVANCEMENT OF A CRACK IN METAL AIRCRAFT STRUCTURES BY MEANS OF LASER SHOCK RAYS

(75) Inventors: Juergen Steinwandel, Uhldingen-Muehlhofen (DE); Domenico Furfari, Hamburg (DE); Nikolaus Ohrloff, Buxtehude (DE); Claudio Dalle Donne, Munich (DE)

(73) Assignee: Airbus Operations GmbH, Hamburg (DE)

( * ) Notice: Subject to any disclaimer, the term of this patent is extended or adjusted under 35 U.S.C. 154(b) by 173 days.

(21) Appl. No.: 13/111,405

(22) Filed: May 19, 2011

(65) Prior Publication Data

US 2011/0290770 A1 Dec. 1, 2011

Related U.S. Application Data

(63) Continuation of application No. PCT/EP2009/065931, filed on Nov. 26, 2009.

(60) Provisional application No. 61/120,158, filed on Dec. 5, 2008.

(30) Foreign Application Priority Data

Dec. 5, 2008 (DE) .......................... 10 2008 044 407

(51) Int. Cl.
*B23K 26/00* (2014.01)
*C21D 10/00* (2006.01)
*B64F 5/00* (2006.01)

(52) U.S. Cl.
CPC ............ *C21D 10/005* (2013.01); *B64F 5/0081* (2013.01); *C21D 10/00* (2013.01)

(58) Field of Classification Search
USPC .............. 219/121.6, 121.61, 121.62, 121.85, 219/121.65, 121.66
See application file for complete search history.

(56) References Cited

U.S. PATENT DOCUMENTS 3,850,698 A  11/1974 Mallozzi et al.
4,401,477 A * 8/1983 Clauer et al. .................. 148/525
(Continued)

FOREIGN PATENT DOCUMENTS

DE   696 15 484   6/2002
DE   602 21 202   4/2008
(Continued)

OTHER PUBLICATIONS

Kaysser, "Surface Modifications in Aerospace Applications," Surface Engineering, Institute of Materials. London, GB. vol. 17, No. 4, pp. 305-312 (Jan. 2001).
(Continued)

*Primary Examiner* — Dana Ross
*Assistant Examiner* — Ayub Maye
(74) *Attorney, Agent, or Firm* — Jenkins, Wilson, Taylor & Hunt, P.A.

(57) ABSTRACT

The present invention provides a method for preventing the forming of cracks and slowing the crack propagation in metallic airplane structural parts by laser shock peening with the following steps: Providing an airplane structural part having a crack; irradiating a first surface area of the airplane structural part close to the crack with a first pulsed laser beam having a first wavelength and a first pulsation frequency, wherein energy of the first laser beam is absorbed by the airplane structural part and a shock wave runs through the airplane structural part, which creates compressive prestressings in the airplane structural part.

39 Claims, 2 Drawing Sheets

(56) References Cited

U.S. PATENT DOCUMENTS

| | | | |
|---|---|---|---|
| 4,937,421 A | | 6/1990 | Ortiz, Jr. et al. |
| 5,131,957 A | * | 7/1992 | Epstein et al. ............... 148/565 |
| 5,569,018 A | * | 10/1996 | Mannava et al. ............ 415/200 |
| 5,591,009 A | * | 1/1997 | Mannava et al. .......... 416/241 R |
| 5,735,044 A | * | 4/1998 | Ferrigno et al. ............ 29/889.1 |
| 5,756,965 A | * | 5/1998 | Mannava ................. 219/121.85 |
| 5,760,904 A | * | 6/1998 | Lorraine et al. ............. 356/513 |
| 5,846,057 A | * | 12/1998 | Ferrigno et al. .......... 416/241 R |
| 5,883,803 A | * | 3/1999 | Vann ............................... 700/59 |
| 6,168,744 B1 | * | 1/2001 | Malshe et al. ................ 264/400 |
| 6,203,633 B1 | | 3/2001 | Clauer et al. |
| 6,238,187 B1 | * | 5/2001 | Dulaney et al. .......... 416/241 R |
| 6,288,358 B1 | | 9/2001 | Dulaney et al. |
| 6,341,936 B1 | * | 1/2002 | Cowie et al. ..................... 415/1 |
| 6,570,126 B2 | | 5/2003 | Suh et al. |
| 6,914,215 B2 | * | 7/2005 | Davis et al. ............. 219/121.85 |
| 7,499,830 B2 | * | 3/2009 | Harding et al. ............... 702/167 |
| 2006/0043239 A1 | * | 3/2006 | Floyd et al. ................... 244/131 |
| 2007/0243071 A1 | * | 10/2007 | Mannava et al. ......... 416/241 R |
| 2008/0241546 A1 | * | 10/2008 | McClain et al. ............. 428/409 |

FOREIGN PATENT DOCUMENTS

| | | |
|---|---|---|
| EP | 1 978 114 A1 | 10/2008 |
| GB | 2 257 163 A | 1/1993 |
| WO | WO 96/27684 A1 | 9/1996 |

OTHER PUBLICATIONS

Shepard et al, "Introduction of Compressive Residual Stresses in TI-6AL-4V Simulated Airfoils Via Laser Shock Processing," Journal of Materials Engineering and Performance, ASM International. Materials Park, OH, US. vol. 10, No. 6, pp. 670-678 (Dec. 2001).

Rodopoulos et al, "Effect of Controlled Shot Peening and Laser Shock Peening on the Fatigue Performance of 2024-T351 Aluminum Alloy," Journal of Materials Engineering and Performance, ASM International. Materials Park, OH, US. vol. 12, No. 4, pp. 414-419 (Aug. 2003).

Ruiz, "Surface acoustic wave velocity measurements on surface-treated metals by laser-ultrasonic spectroscopy," University of Cincinnati, Cincinnati. pp. 1-146 (Feb. 2004).

Rubio-Gonzalez et al., "Effect of laser shock processing on fatigue crack growth and fracture toughness of 6061-T6 aluminum alloy," Materials Science Engineering A: Structural Materials: Properties, Microstructure & Processing. Lausanne, CH. vol. 386, No. 1-2, pp. 291-295 (Nov. 2004).

Liu et al, "The effect of laser power density on the fatigue life of laser-shock-peened 7050 aluminum alloy," Fatigue &Fracture of Engineering Materials & Structures. vol. 30, pp. 1110-1124 (2007).

International Search Report for PCT Application No. PCT/EP2009/065931 dated Apr. 21, 2010.

German Office Action for Application No. 10 2008 044 407.3 dated Oct. 17, 2013.

* cited by examiner

METHOD FOR PREVENTING CRACK FORMATION AND FOR SLOWING DOWN THE ADVANCEMENT OF A CRACK IN METAL AIRCRAFT STRUCTURES BY MEANS OF LASER SHOCK RAYS

CROSS-REFERENCE TO RELATED APPLICATIONS

This application is a continuation of and claims priority to PCT International Application No. PCT/EP2009/065931 filed Nov. 26, 2009, which claims the benefit of and priority to U.S. Provisional Application No. 61/120,158, filed Dec. 5, 2008 and German Patent Application No. 10 2008 044 407.3, filed Dec. 5, 2008, the entire disclosures of which are herein incorporated by reference.

FIELD OF THE INVENTION

The present invention relates to a method for preventing crack formation and for slowing down the advancement of a crack in metal aircraft structures.

Cracks in aircraft structures are usually attributed to a weakening of material due to static or dynamic mechanical stresses. In particular, material fatigue results from vibration stresses. Cracks are regarded as serious damage to the aircraft structure and require immediate repair measures. The mentioned cracks are the result of normal flight operation.

In addition, the formation and progression of a crack can occur as the result of accidental damage to an aircraft structure in the form of scratches during faulty maintenance work. Scratches often occur during the maintenance of rivet connections which join two metal sheets arranged in the lap joint. The rivet connections are opened for maintenance purposes and, before the new rivet connections are made, a corrosion protection means or an adhesive paste is introduced between the metal sheets in the lap joint. After maintenance, the rivet connections are re-closed and, in so doing, some of the adhesive paste is pressed out of the overlap region. Later on, the surplus protruding paste is removed by the maintenance crew, for example using a blade. As a result, scratches in the metal sheets are often produced in the vicinity of the lap joints.

Such accidental damage is the starting point of a subsequent crack formation or subsequent advancement of the crack. Thus it is expedient to make good damage of this type by repair measures in order to ensure a desirable degree of flight safety.

Conventionally, cracks are repaired during maintenance in that the entire region in which cracks have formed is cut out and replaced by new material which is inserted therein or arranged thereover. In the case of scratches where it is expected that cracks will form emanating from said scratches, the repair procedure is presently carried out in the same manner as for the repair of cracks. Present repair methods have disadvantages. On the one hand, the replacement of wing unit regions is time-consuming and entails increased repair and operating costs. The replacement regions are also weak points particularly in respect of a homogeneous continuous material strength. Consequently, the repaired regions afford only a reduced strength in respect of new crack formation.

The problems which have been described occur particularly in the case of aluminium-based alloys, but also occur to a lesser extent in titanium alloys.

It is known to treat material regions which are susceptible to crack formation with laser shock irradiation (laser shock hardening, laser shock treatment or laser shock hammering) before they are used. Laser shock irradiation is a method for producing a region of low compressive residual stresses in that the surface of a workpiece is treated using laser shock beams. Laser shock irradiation usually uses radiation pulses from high-power pulsed lasers to transfer impulse waves or shock waves onto the surface of a workpiece. The pulsed laser beam, impacting the surface of the component, from the laser beam source generates a strong local compressive force on a portion of the surface. A plasma is produced at the impact point of the laser beam due to a sudden stripping or evaporation of a thin layer of this surface or of a coating (for example a strip or a coat of paint), as a result of which an explosive force is generated. The pressure pulse from the rapidly spreading plasma releases a shock wave which drifts into the object. This compressive shock wave caused by the laser pulse produces deep plastic compressive deformations in the component. These plastic deformations produce compressive residual stresses in the material. Laser shock irradiation is described in U.S. Pat. No. 3,850,698 entitled "Altering Material Properties" and in U.S. Pat. No. 4,401,477 entitled "Laser Shock Processing". In laser shock irradiation, a strong local compressive force is transferred to part of the workpiece surface. Laser shock irradiation is used to produce a compression-stressed protective layer on the outer surface of a workpiece, thereby substantially increasing the resistance of the workpiece to fatigue fracture. This application is described in, for example U.S. Pat. No. 4,937,421, entitled "Laser Peening System and Method".

A general treatment in advance of regions fraught with risk in respect of crack formation, for example by laser shock irradiation, is cost-intensive. The damage in the form of scratches only occurs locally in specific places, as described above. Only in the regions surrounding these damaged areas is treatment necessary in respect of crack prevention.

SUMMARY OF THE INVENTION

Therefore, the object of the present invention is to provide a method by which it is possible to reduce crack formation on structural parts of aircraft which exhibit damage in the form of scratches and to slow down the progression of the crack. The method is to allow the damaged regions to be treated and at the same time to cause only the least possible weakening of the regions surrounding the damage. Furthermore, the surface is to be roughened as little as possible by the method. In addition, crack formation and advancement of the crack is to be prevented and slowed down in a particularly economical manner.

This object is achieved according to the invention by a method for preventing crack formation and for slowing down the advancement of a crack in metal aircraft structures by means of laser shock irradiation.

For the method for preventing crack formation and for slowing down the advancement of a crack in metal aircraft structures by means of laser shock, irradiation, a structural part of an aircraft which has a damaged area is provided in a first step.

Since the aircraft structural part is subsequently irradiated by high-energy laser beams, it is preferably provided in a shielded region to prevent damage to the periphery by the laser beams. For this purpose, the surface to be irradiated is preferably shielded locally, since on the one hand shielding the entire aircraft is complex due to its size and on the other hand sensitive parts of the aircraft, for example the engines, must be protected from laser beams. For this, the aircraft can either be brought under an appropriate stationary shielding in a hangar, for example, or can be shielded by a shielding device which can be used in a mobile fashion. The advantage of these variants is that the component which exhibits the damaged area does not have to be dismantled, which implies a considerable effort and carries the risk of renewed damage.

In a subsequent method step, a first superficial region of the aircraft structural part is irradiated near the damaged area by means of a first pulsed laser beam of a first wavelength and a first pulse frequency, energy from the first laser beam being absorbed by the aircraft structural part and a pressure wave passes through the aircraft structural part which generates compressive prestresses in said aircraft structural part.

The pulsed laser beam, impacting on the component surface, from the laser beam source generates a strong local compressive force on a portion of the surface. A plasma is produced at the impact point of the laser beam due to a sudden stripping or evaporation of a thin layer of this surface or of a coating (for example a strip or a coat of paint), as a result of which an explosive force is generated. The pressure pulse from the rapidly spreading plasma releases a shock wave which drifts into the object. This compressive shock wave caused by the laser pulse produces deep plastic compressive deformations in the component. These plastic deformations produce compressive residual stresses in the material. The idea on which the present invention is based is that the formation and progression of cracks in aircraft structures in regions adjoining a damaged area, for example a scratch, are substantially reduced in that such deeply penetrating compressive stresses are introduced into the aluminium-based alloys. Consequently, it is possible to effectively achieve an improvement in stability around a damaged area without replacing the component concerned. For example, with the method according to the invention, if the surface of the aircraft structural part is accidentally damaged during maintenance, the laser shock irradiation around the scratched region can prevent the scratches from causing fatigue cracks when the aircraft structural part is subjected to a dynamic permanent load.

To prevent the formation and progression of a crack, critical regions which are expected to be exposed to external superficial effects which cause damaged areas can be treated according to the invention by laser shock irradiation even during the manufacture of the aircraft, thereby increasing the fatigue strength of these regions.

The advantages of using laser shock beams to improve the fatigue strength of specific structural regions and of treating scratched regions are as follows: the maintenance intervals in respect of the strength of the wing unit can be increased. Consequently, operating costs can be reduced. Aircraft immobilisation time on the ground during maintenance can be reduced by the simple repair of scratches. Flight safety and thus the safety of the passengers can be increased by the improved characteristics of the wing units.

Advantageous embodiments and improvements of the invention are provided in the subclaims.

According to a preferred development of the method according to the invention, the first superficial region treated by laser shock beams completely surrounds the damaged area. This prevents the crack from advancing out of the damaged area in all directions. In the case of a damaged area on the edge of the aircraft structural part, the superficial region treated by laser shock beams can particularly preferably extend between the damaged area and important structural regions of the component, and thus can form a blockade to the advance of the crack in a specific direction to prevent the crack from spreading into specific regions of the component.

According to a preferred development of the method according to the invention, after a first laser shock irradiation, the first superficial region is shock-irradiated by a second laser beam which has a different wavelength and/or a different pulse frequency than the first laser beam. A desired change in the material characteristics can be adjusted very precisely by the combined treatment using two different laser beams. Thus, the wavelength of the laser and the pulse frequency can be used to adjust the type of compressive residual stresses and the depth thereof in the material as well as the influencing of the component surface.

According to a preferred development of the method according to the invention, a second superficial region close to the first superficial region is treated by a second laser beam of a second wavelength and a second pulse frequency. This second superficial region is preferably arranged such that it surrounds the first superficial region. In this respect, different compressive prestresses can be formed in the component material under the second superficial region compared to in the component material under the first superficial region. Consequently, by means of the altered characteristics in the material under the second superficial region, it is possible to prevent cracks which have formed through the first superficial region from developing further.

According to a preferred development of the method according to the invention, the power of the first laser beam is varied as a function of the distance of the impact point of the first laser on the first surface from the damaged area. By means of this configuration of the method according to the invention, the compressive prestresses in the aircraft structural component can be generated in a scaled manner as a function of the distance from the damaged area. The component produced thus has a compressive prestress gradient which can preferably increase towards the damaged area or also away from it. The gradual transition from the component material treated by laser shock beams to untreated component material allows an improved endurance strength of the component.

According to a preferred development of the method according to the invention, after the laser shock irradiation, the damaged area is provided with a coating based on plastics material. This coating can seal the damaged area and thus prevent moisture from penetrating inside the damaged area. Consequently, corrosion resistance can be improved, particularly if a superficial coating was damaged by the damaged area. An anodising procedure can preferably also be carried out.

According to a preferred development of the method according to the invention, after the laser shock irradiation, the respective superficial region can be machined. Due to the laser treatment, a roughening of the surface of the component in the region irradiated by the laser often results. It is advantageous here to obtain a smoothed surface. For this purpose, the lasered superficial region is particularly preferably ground, preferably polished or irradiated.

According to a preferred development of the method according to the invention, with laser shock irradiation, the laser beam is guided in a continuous path during irradiation, the position of the damaged area being detected by optical sensor technology and the laser beam being guided over the aircraft structural part such that a fixed distance from the damaged area is observed. The sensor-guided continuous-path control of the laser beam can adjust a precise distance from the damaged area. The laser beam can be guided automatically, for example substantially parallel to a linear scratch. Thus, accidental irradiation of the damaged area itself can be avoided, if this is not desired.

BRIEF DESCRIPTION OF THE DRAWINGS

In the following, the invention will be described in more detail on the basis of embodiments with reference to the accompanying figures of the drawings.

DESCRIPTION OF EXEMPLAR EMBODIMENTS

Figure 1:
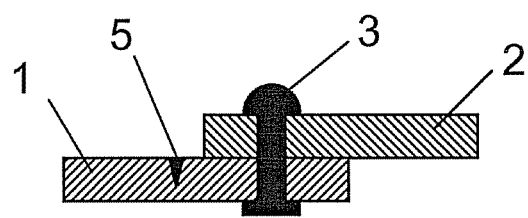
FIG. 1 is a schematic sectional view of a rivet connection of two structural parts of an aircraft.

In the figures, the same reference numerals denote the same or functionally identical components, unless indicated otherwise.

FIG. 1 is a schematic sectional view of a rivet connection 3 of two structural parts 1, 2 of an aircraft. A first aircraft structural part 1 and a second aircraft structural part 2 are positioned one above the other in the lap joint. They are held together by rivet connections 3. In the first aircraft structural part 1 is a damaged area 5, as can occur, for example as a scratch when sealing paste which is squeezed out of the lap joint is removed using a blade. In this case, the damaged area 5 is substantially linear and extends into the image plane.

Figure 2:
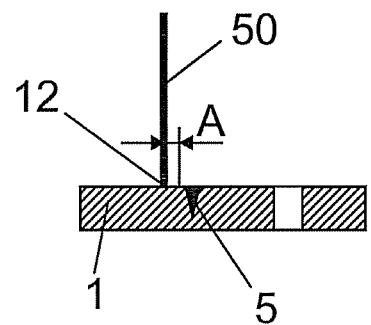
FIG. 2 is a schematic sectional view of a laser shock irradiation of an aircraft structural part according to a first embodiment.

FIG. 2 is a schematic sectional view of a laser shock irradiation of an aircraft structural part 1 according to a first embodiment. Here, the aircraft structural part 1 is shown without the second aircraft structural part 2 and without the rivet connections 3. The damaged area 5 extends into the image plane. A first laser beam 50 is directed onto the aircraft structural part 1. The laser beam 50 impacts the aircraft structural part 1 at a point of impact 12. In this stage of the method, the point of impact 12 is at a distance A from the damaged area 5. In the figure, the distance A is indicated by a vertical aid line and two arrows.

Figure 3:
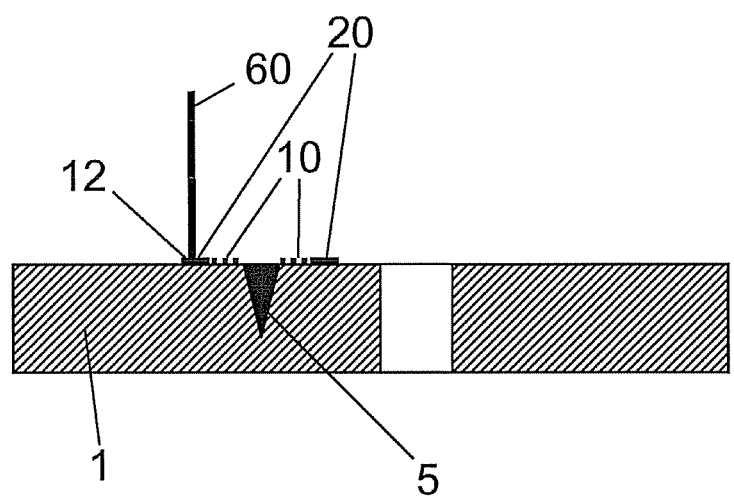
FIG. 3 is a schematic sectional view of a laser shock irradiation of an aircraft structural part according to a second embodiment.

FIG. 3 is a schematic sectional view of a laser shock irradiation of an aircraft structural part 1 according to a second embodiment. Provided next to the damaged area 5 are a first superficial region 10 and a second superficial region 20 of the aircraft structural part 1 for a laser shock beam treatment. In the illustrated stage of the method, a second laser beam 60 is directed at the second superficial region 20 at a point of impact 12. The laser is moved in a continuous path over the second superficial region 20 and performs a laser shock irradiation. In this preferred embodiment, the laser shock irradiation of the second superficial region 20 is performed in addition to the laser shock irradiation of the first superficial region 10. While the first superficial region was subjected to laser shock irradiation by the first laser beam 50, a second laser beam 60 is used for the second superficial region. In this embodiment, the second laser beam 60 has different characteristics compared to the first laser beam 50. Thus, in this case the pulse frequency and light wavelength used of the second laser beam differs from that of the first laser beam 50 in order to produce different changes in the material characteristics in the material regions under the first superficial region 10 and the second superficial region 20. In any case, a plasma is produced by the pulsed laser beam 60 at the point of impact 12 of the laser beam 60 due to a sudden stripping or evaporation of a thin layer of this surface or of a coating (for example a strip or a coat of paint), as a result of which an explosive force is generated. The pressure pulse from the rapidly spreading plasma releases a shock wave which drifts into the object. This compressive shock wave caused by the laser pulse produces deep plastic compressive deformations in the component. These plastic deformations produce compressive residual stresses in the material which counteract the development or spread of fatigue cracks. Thus, the method according to the invention can effectively stabilise a damaged area against the formation of fatigue cracks.

Although the present invention has been described here on the basis of preferred embodiments, it is not restricted thereto, but can be modified in many different ways.

LIST OF REFERENCE NUMERALS 1 aircraft structural part
5 damaged area
10 first superficial region
12 point of impact
20 second superficial region
50 first laser beam
60 second laser beam
A distance

The invention claimed is:

1. A method of repairing superficial damage to an aircraft structural part for preventing crack formation and for slowing down advancement of a crack in metal aircraft structures by laser shock beams, comprising: (a) providing an aircraft structural part which has a damaged area, the damaged area being superficial damage comprising a scratch; (b) treating the damaged aircraft structural part by laser shock irradiating a first superficial region of the aircraft structural part close to the damaged area with a first pulsed laser beam of a first wavelength and a first pulse frequency, wherein the laser shock irradiating is performed locally in a region of the scratch, wherein energy from the first pulsed laser beam is absorbed by the aircraft structural part, and wherein a pressure wave passes through the aircraft structural part which generates a compressive pre-stress in the aircraft structural part in order to prevent crack formation and to slow down advancement of a crack.

2. The method according to claim 1, wherein the first superficial region completely surrounds the damaged area.

3. The method according to claim 1, wherein treating the damaged aircraft structural part further comprises irradiating the first superficial region with a second pulsed laser beam, different than the first pulsed laser beam, the second pulsed laser beam having a second wavelength and a second pulse frequency, the second wavelength and the second pulse frequency being different from the first wavelength and the first pulse frequency.

4. The method according to claim 1, further comprising treating a second superficial region close to the first superficial region using a second pulsed laser beam, different than the first pulsed laser beam, the second pulsed laser beam having a second wavelength and a second pulse frequency, the second wavelength and the second pulse frequency being different from the first wavelength and the first pulse frequency.

5. The method according to claim 1, wherein the first superficial region extends at a distance of less than 20 mm from the damaged area.

6. The method according to claim 1, wherein a power of the first pulsed laser beam varies as a function of a distance from an impact point of the first pulsed laser beam on the first surface to the damaged area.

7. The method according to claim 1, further comprising providing the damaged area with a coating based on plastics material.

8. The method according to claim 1, further comprising machining the first superficial region and/or the second superficial region.

9. The method according to claim 1, wherein the first pulsed laser beam is guided in a continuous path in the first superficial region during irradiation, a position of the damaged area being detected by optical sensor technology and the first pulsed laser beam being guided over the aircraft structural part such that a fixed distance to the damaged area is maintained.

10. The method according to claim 3, wherein the second pulse frequency is at least 20% greater than or less than the first pulse frequency.

11. The method according to claim 3, wherein the second wavelength is at least 20% greater than or less than the first wavelength.

12. The method according to claim 4, wherein the second superficial region completely surrounds the first superficial region.

13. The method according to claim 4, wherein the second superficial region extends at a distance of less than 40 mm from the damaged area.

14. The method according to claim 4, wherein the second pulse frequency is at least 20% greater than or less than the first pulse frequency.

15. The method according to claim 4, wherein the second wavelength is at least 20% greater than or less than the first wavelength.

16. The method according to claim 6, wherein the power of the first pulsed laser beam increases with an increasing distance from the impact point of the first pulsed laser beam on the first surface to the damaged area.

17. A method of repairing superficial damage to an aircraft structural part for preventing crack formation and for slowing down advancement of a crack in metal aircraft structures by laser shock beams, the method comprising:
   (a) providing an aircraft structural part which has a damaged area; and
   (b) treating the damaged aircraft structural part by laser shock irradiating a first superficial region of the aircraft structural part close to the damaged area with a first pulsed laser beam of a first wavelength and a first pulse frequency;
   wherein treating the damaged aircraft structural part further comprises irradiating the first superficial region with a second pulsed laser beam, different than the first pulsed laser beam, the second pulsed laser beam having a second wavelength and a second pulse frequency, the second wavelength and the second pulse frequency being different from the first wavelength and the first pulse frequency.

18. The method according to claim 17, wherein the damaged area comprises a scratch.

19. The method according to claim 17, wherein the first superficial region completely surrounds the damaged area.

20. The method according to claim 17, wherein the second pulse frequency is at least 20% greater than or less than the first pulse frequency.

21. The method according to claim 17, wherein the second wavelength is at least 20% greater than or less than the first wavelength.

22. The method according to claim 17, wherein the first superficial region extends at a distance of less than 20 mm from the damaged area.

23. The method according to claim 17, further comprising providing the damaged area with a coating based on plastics material.

24. The method according to claim 17, wherein energy from the first pulsed laser beam is absorbed by the aircraft structural part, and wherein a pressure wave passes through the aircraft structural part which generates a compressive pre-stress in the aircraft structural part in order to prevent crack formation and to slow down advancement of a crack.

25. The method according to claim 17, wherein a power of the first pulsed laser beam varies as a function of a distance from an impact point of the first pulsed laser beam on the first surface to the damaged area.

26. The method according to claim 25, wherein the power of the first pulsed laser beam increases with an increasing distance from the impact point of the first pulsed laser beam on the first surface to the damaged area.

27. A method of repairing superficial damage to an aircraft structural part for preventing crack formation and for slowing down advancement of a crack in metal aircraft structures by laser shock beams, the method comprising:
   (a) providing an aircraft structural part which has a damaged area;
   (b) treating the damaged aircraft structural part by laser shock irradiating a first superficial region of the aircraft structural part close to the damaged area with a first pulsed laser beam of a first wavelength and a first pulse frequency; and
   (c) treating a second superficial region close to the first superficial region using a second pulsed laser beam, different than the first pulsed laser beam, the second pulsed laser beam having a second wavelength and a second pulse frequency, the second wavelength and the second pulse frequency being different from the first wavelength and the first pulse frequency.

28. The method according to claim 27, wherein the damaged area comprises a scratch.

29. The method according to claim 27, wherein the first superficial region completely surrounds the damaged area.

30. The method according to claim 27, wherein energy from the first pulsed laser beam is absorbed by the aircraft structural part, and wherein a pressure wave passes through the aircraft structural part which generates a compressive pre-stress in the aircraft structural part in order to prevent crack formation and to slow down advancement of a crack.

31. The method according to claim 27, wherein the second superficial region completely surrounds the first superficial region.

32. The method according to claim 27, wherein the second superficial region extends at a distance of less than 40 mm from the damaged area.

33. The method according to claim 27, wherein a power of the first pulsed laser beam varies as a function of a distance from an impact point of the first pulsed laser beam on the first surface to the damaged area.

34. The method according to claim 33, wherein the power of the first pulsed laser beam increases with an increasing distance from the impact point of the first pulsed laser beam on the first surface to the damaged area.

35. The method according to claim 27, further comprising providing the damaged area with a coating based on plastics material.

36. The method according to claim 27, further comprising machining the first superficial region and/or the second superficial region.

37. The method according to claim 27, wherein the first pulsed laser beam is guided in a continuous path in the first superficial region during irradiation, a position of the damaged area being detected by optical sensor technology and the first pulsed laser beam being guided over the aircraft structural part such that a fixed distance to the damaged area is maintained.

38. The method according to claim 27, wherein the second pulse frequency is at least 20% greater than or less than the first pulse frequency.

39. The method according to claim 27, wherein the second wavelength is at least 20% greater than or less than the first wavelength.

\* \* \* \* \*